W. G. HILL.
SCRIBING DEVICE.
APPLICATION FILED SEPT. 15, 1919.
1,351,476.
Patented Aug. 31, 1920.
2 SHEETS—SHEET 1.
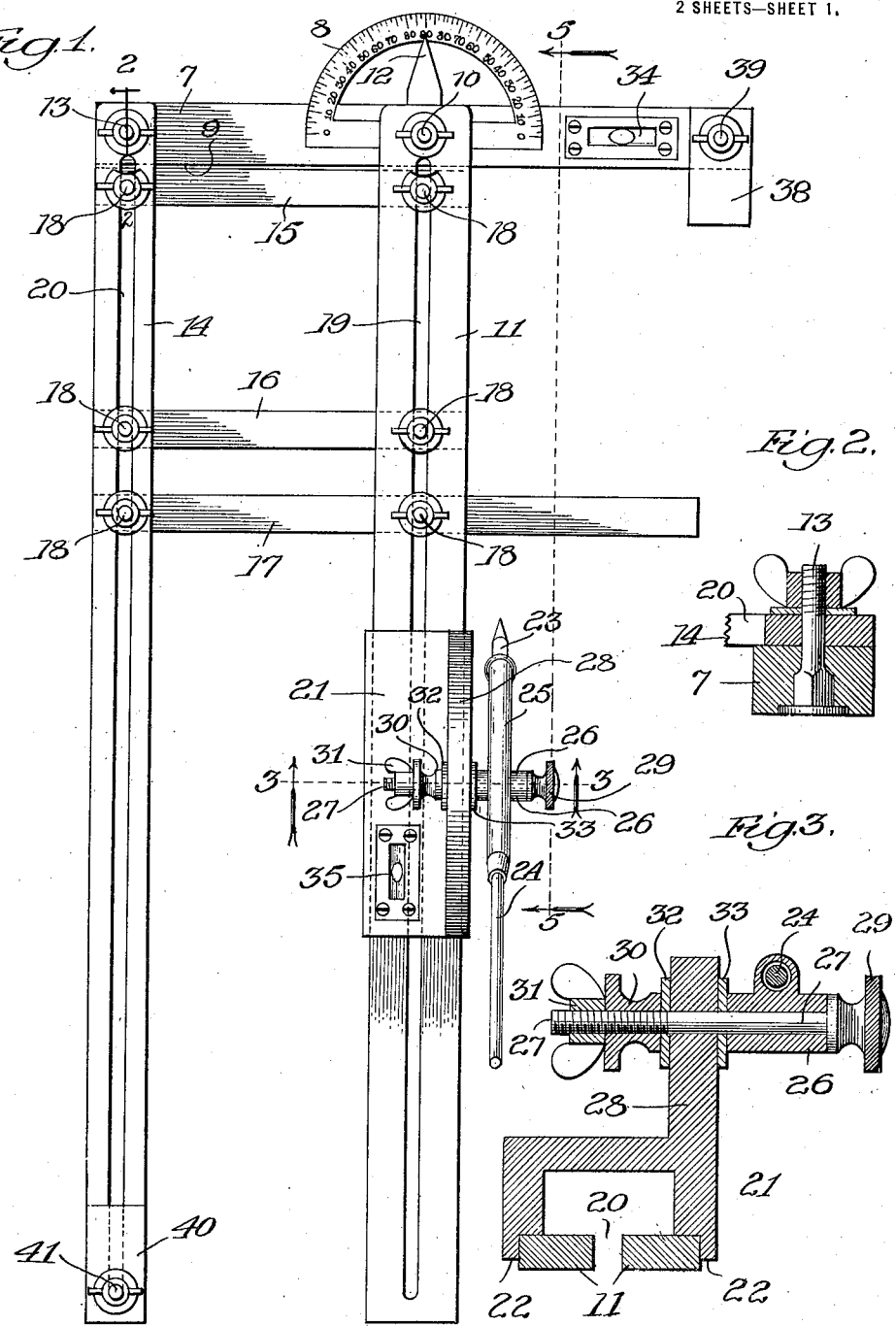
Inventor:
Walter G. Hill, W. G. HILL.
SCRIBING DEVICE.
APPLICATION FILED SEPT. 15, 1919.
1,351,476.
Patented Aug. 31, 1920.
2 SHEETS—SHEET 2.
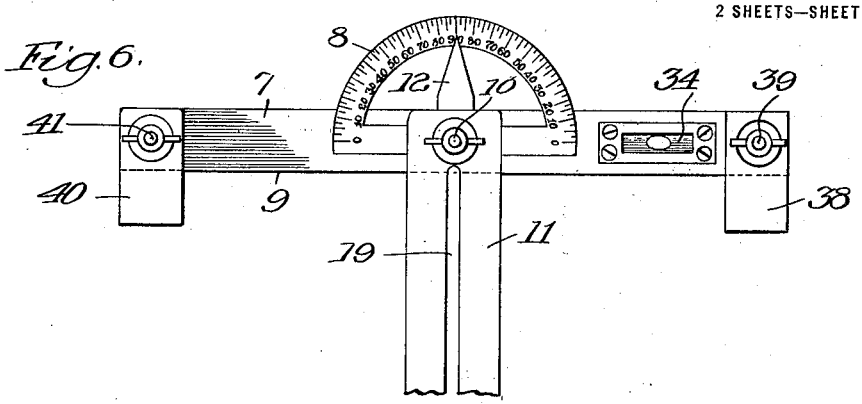
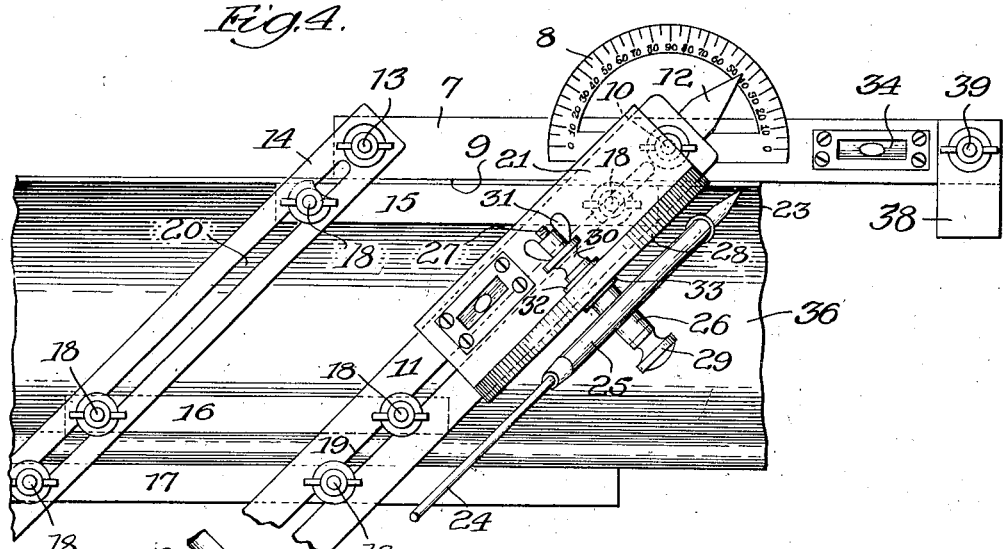
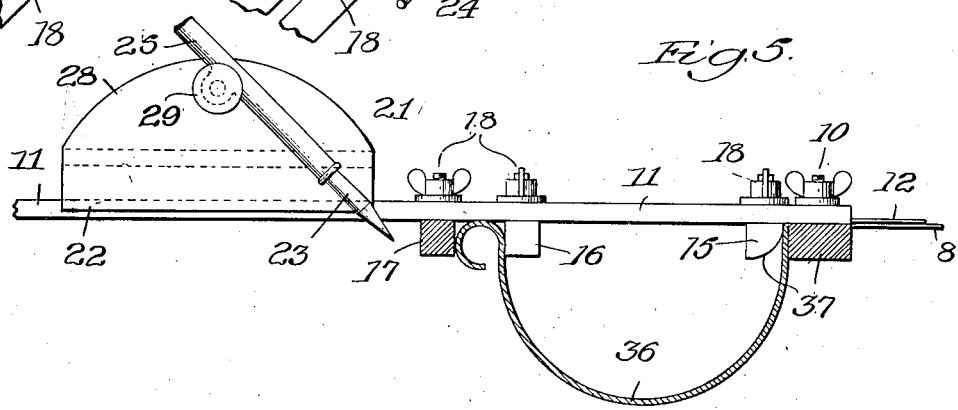
Inventor:
Walter G. Hill,
By Dyrenforth, Lee, Chritton & Wiles,
Attys.

UNITED STATES PATENT OFFICE.

WALTER G. HILL, OF CHICAGO, ILLINOIS.

SCRIBING DEVICE.

1,351,476.   Specification of Letters Patent.   Patented Aug. 31, 1920.

Application filed September 15, 1919. Serial No. 323,899.

*To all whom it may concern:*

Be it known that I, WALTER G. HILL, a citizen of the United States, residing at Chicago, in the county of Cook and State of Illinois, have invented a new and useful Improvement in Scribing Devices, of which the following is a specification.

My invention relates more particularly to a device for marking the angles of any desired degree at which the ends of objects are to be cut preparatory to the joining together of the objects to cause them to extend, when joined together, at the desired angular relation to each other.

One of my objects is to provide a novel, simple and economically constructed device whereby an object to be joined to another object, may be readily marked and the marking, thus produced, serve as a guide for the workman in the cutting of the object to the desired angular shape. Another object is to provide a device whereby such marking may be accomplished on the object when it occupies its place of use as for example in the case of gutters, moldings and the like. Another object is to provide such a device whereby the angle at which the object is to be cut may be varied as desired; and other objects as will be manifest from the following.

Referring to the accompanying drawings. Figure 1 shows by a plan view, a device embodying my invention. Fig. 2 is an enlarged section taken at the line 2—2 on Fig. 1 and viewed in the direction of the arrows. Fig. 3 is an enlarged section taken at the line 3—3 on Fig. 1 and viewed in the direction of the arrows. Fig. 4 is a view like Fig. 1 showing the device applied to a gutter to be marked and adjusted to produce the marking of the gutter at an angle oblique to the axis thereof. Fig. 5 is a section taken at the line 5—5 on Fig. 1 and viewed in the direction of the arrows, showing the device clamped to a gutter to be marked and Fig. 6 is a broken view like Fig. 1 showing the device conditioned for use in marking an object where conditions are such, as for example in the case of corrugated sheets of metal, that the device may be applied to a straight edge of the object without any clamping action.

According to the preferred illustrated embodiment of my invention I form the device of a bar 7 with a protractor 8 mounted thereon to extend with its zero markings parallel with the straight edge 9 of the bar 7. Pivotally connected at one end, as by a clamp screw device 10, to the bar 7 directly in line with the 90 degree marking of the protractor 8, is a bar 11, this bar carrying a pointer 12 and the pivot 10 being coincident with the center about which the arc of the protractor is described. The bar 7 at one end has pivotally connected therewith, as by a clamp screw 13, a bar 14, the bars 11 and 14 being connected with the ends of cleats 15, 16 and 17, through the medium of clamping screws 18, these cleats being adjustable along the bars 11 and 14, this adjustment being possible by reason of the longitudinally extending slots 19 and 20 provided in the bars 11 and 14, respectively, through which the clamping screws 18 extend, the cleats 15, 16 and 17 serving as means for clamping the device in position on an object to be marked. The bar 11 serves as a support for a slide 21 having depending flanges 22 which, with the body of the slide 21, form recesses 22ª into which the bar 11 extends at its edges, this slide carrying a marking device of any desirable construction and which, in the particular construction shown, is formed of a marker 23 which may be a pencil, scratcher, or other suitable device, mounted upon the end of a rod 24 which is slidable lengthwise in a tube 25 journaled at a sleeve 26 thereon, on a threaded rod 27 mounted in the upwardly extending flange 28 of the slide 21. One end of the rod 27 is provided with a knurled head 29 and its opposite, threaded, end has a nut 30 screwed thereon and beyond this nut carries a winged clamp nut 31, washers 32 and 33 surrounding the rod 27 and being interposed between the flange 28 and the nut 30 and head 26, whereby the rod 27 may be held in the desired clamped position on the slide 21 while permitting relatively free movement of the device 25 about the rod 27 as a pivot.

In the use of the device, as for example to mark a gutter to be joined to another section of gutter at a 90 degree angle, the bars 11 and 14 are swung upon their pivots 10 and 13 to a position in which they extend at angles of 45 degrees to the bar 7, such angular adjustment being indicated by the position of the pointer 12 relative to the 45 degree marking on the protractor as shown in Fig. 4. The clamp screws 10 and 13 are then tightened and the device applied to the open side of the gutter represented at 36 when of the form shown, to clamp one of its opposite edges between the bar 7 and cleat 15 and its other opposite edge between the cleats 16 and 17, as for example as shown in Fig. 5, the clamp screws 18 thereupon being tightened to rigidly hold the device in place on the gutter. Of course, it will be understood that where one edge of the gutter is higher than the other the device should be clamped to the highest edge even though thereby the device is not clamped to the other edge. In this connection it may be stated that the device in the performing of the marking operation thereof as hereinafter described, should be maintained parallel with the base of the object to be marked, and to aid in thus positioning the device I provide on the bar 7 and on the slide 21 spirit-levels 34 and 35, respectively.

With the device positioned on the object to be marked, as for example the gutter 36, the operator moves the slide 21 along the bar 11 and rotates the marking device on the rod 27 to move the point of the marker 23 into a position where it engages the inner surface of the gutter 36 at one of its edges as represented in Fig. 4. The operator then manipulates the marking device, to cause the gutter to be marked on its inner surface from the edge above referred to to and at the extremity of its opposite edge, the feature of the pivoting of the head 26 on the rod 27, the adaptability of the marker device 23 to slide at its stem 24 on the head 26 and the provision of the slide 21 permitting the operator to cause the marker 23 to make a continuous line over the above referred to portions of the gutter, and this regardless of irregularities in the contour of the object to be marked. With the object thus marked the workman may readily, by following the marking thus made, cut the gutter to produce the desired 45 degree angle.

In the drawings the device as shown is clamped at the bar 7 and its cleat 15 to the unbeaded edge of the gutter and at its cleats 16 and 17 to the beaded edge thereof, but it will be understood that if desired the clamping may be reversed, the device clamping the beaded edge between the bar 7 and the cleat 15 and the other edge between the cleats 16 and 17. It is desirable, however, that one of the cleats, as the cleat 15, be curved as indicated at 37 along the edge thereof which opposes the gutter edge, as the clamping action of the device on the gutter is enhanced thereby where this edge of the gutter is outwardly bent as is sometimes the case in practice. It will be noted that in the particular construction illustrated the end of the bar 7 opposite that to which the bar 14 is pivotally connected, carries a relatively short bar section 38 connected therewith by a clamp bolt 39 and the outer extremity of the bar 14 also carries such a bar section 40 secured thereto by a clamp bolt 41. The primary purpose of the bar sections 38 and 40 is that of forming stops for the device when applied, without any clamping action, to an object to be marked. As for example if it is desired to cut a corrugated sheet of metal, having a straight edge, the device would be applied to the sheet by positioning it at its edge 9 against the straight edge of the sheet in which position the bars 38 and 40, the bar 14 having been removed and the bar 40 substituted therefor as shown in Fig. 6, would overlap the face of the sheet and serve to hold the device in position thereon during the marking operation which would be performed by manipulating the marking device, including the slide 21, as hereinbefore explained, the bar 11 having been adjusted at its pivot 10 to the desired angular position relative to the bar 7.

It will be understood that the device may be used for marking other objects than gutters and that by reason of its features hereinbefore explained, it may be positioned, and clamped if desired, in varying positions on the objects as conditions render it advisable for effecting the most desirable marking, and as an instance of the latter it may be stated that instead of applying it to an edge of the object, it may be applied to the base of the latter and marked exteriorly, where the gutter is of the square-base type and its sides are of different heights.

While I have illustrated and described certain particular embodiments of my invention, I do not wish to be understood as intending to limit it thereto as the invention may be embodied in other forms of structures.

What I claim as new and desire to secure by Letters Patent is:

1. In a device of the character set forth, the combination of a member adapted to be positioned relative to the surface of an object to be marked, a slide movable lengthwise of said member, a member pivoted on said slide on an axis extending crosswise of the direction of movement of said slide and adapted to rock on its pivot in the use of the device, and a marking device mounted on said second-named member and shiftable lengthwise thereon in the operation of the device.

2. In a device of the character set forth, the combination of clamping means adapted to clamp the edge of an object to be marked, a bar connected therewith to extend crosswise of the object and adjacent a surface thereof to be marked, a slide movable along said bar and a marking device movably supported on said slide and adapted to mark the surface of the object.

3. In a device of the character set forth, the combination of a member adapted to be positioned relative to the surface of an object to be marked, a slide movable lengthwise of said member, a member pivoted on said slide on an axis extending crosswise of the direction of movement of said slide, said last-named member being provided with a guide extending crosswise of the axis on which it is pivoted, and a marking device engaging said guide and shiftable lengthwise thereon in a direction crosswise of said axis.

4. In a device of the character set forth, the combination of a member adapted to be positioned relative to the surface of an object to be marked, a slide movable lengthwise of said member, a member pivoted on said slide on an exis extending crosswise of the direction of movement of said slide and provided with a sleeve portion extending at an angle to the axis on which said second-named member is pivoted, and a marking device located, and slidable lengthwise, in said sleeve.

5. In a device of the character set forth, the combination of clamping means adapted to clamp an edge of a trough-like object to be marked, a bar connected therewith to extend crosswise of the object and adjacent a surface thereof to be marked, clamping means adapted to clamp the opposite edge of the object and engaging said bar, and a marking device movably supported on said bar and adapted to mark the unlevel surface of the object.

6. In a device of the character set forth, the combination of a member adapted to be positioned relative to the surface of an object to be marked, a slide movable lengthwise of said member, said slide containing recesses in its bottom side in which the opposite edges of said member extend and affording spaced-apart guiding portions, and a marking device located laterally beyond said slide and adapted to be movable thereon crosswise of the plane in which said slide moves along said member.

WALTER G. HILL.